United States Patent [19]

Saito et al.

[11] Patent Number: 4,765,425
[45] Date of Patent: Aug. 23, 1988

[54] ELECTRIC POWER STEERING APPARATUS

[75] Inventors: Shigeki Saito; Masato Sakai, both of Katsuta, Japan

[73] Assignee: Hitachi, Ltd., Tokyo, Japan

[21] Appl. No.: 66,331

[22] Filed: Jun. 25, 1987

[30] Foreign Application Priority Data

Jun. 25, 1986 [JP] Japan ................... 61-146927

[51] Int. Cl.4 ............................................. B62D 5/04
[52] U.S. Cl. ................................. 180/79.1; 74/388 PS
[58] Field of Search ........................ 180/79.1, 148; 74/388 PS

[56] References Cited

U.S. PATENT DOCUMENTS 4,573,545 3/1986 Kalns ..................... 180/79.1

FOREIGN PATENT DOCUMENTS 61-41670 2/1986 Japan ..................... 180/79.1

Primary Examiner—John A. Pekar
Attorney, Agent, or Firm—Antonelli, Terry & Wands

[57] ABSTRACT

An electric power steering apparatus comprises a steering shaft 34, a detector 27 for detecting an operation of the power steering apparatus, an electric motor 3 driven in response to an output of the detector 27 for generating an assisting force for a steering operation, and a reduction gear 1 including an input shaft 2 driven by the electric motor 3, an output shaft 13 connected to the steering shaft 34, and a planetary gear mechanism 36 for reducing the rotational speed of the input shaft 2 and transmitting the reduced rotational speed to the output shaft 13. The planetary gear mechanism 36 includes a sun gear 6 rotatable with the input shaft 2, a ring gear 8, planet gears 7 connected to the output shaft 13 and adapted to transmit revolving motion thereof around the sun gear 6 to the output shaft 13, and a gear case 18 for accommodating the sun gear 6, the ring gear 8, and the planet gear 7. As electromagnetic clutch 35 is accommodated in the gear case 18 and is switched over in response to the output of the detector 27 between a first position in which it locks the ring gear 8 unrotatably and a second position in which it releases the ring gear 8 to allow it to be rotatable with respect to the output shaft 13.

4 Claims, 2 Drawing Sheets

ELECTRIC POWER STEERING APPARATUS

BACKGROUND OF THE INVENTION

1. Field of the Invention

The present invention relates to an electric power steering apparatus of a type which is capable of generating an assisting force for a steering operation by means of an electric motor.

2. Description of the Prior Art

The above-described type of power steering apparatus generally includes speed reduction means provided between an electric motor and a steering shaft, and clutch means for disengaging the steering shaft from the motor at the time of the latter's failure, or the like. Such a power steering apparatus is disclosed in, for example, the specification of Japanese Patent Laid-Open No. 16958/1983.

The power steering apparatus of the type disclosed in the above specification comprises: a steering shaft; means for detecting the operation of the power steering apparatus; a motor driven in response to the output of the detection means for generating an assisting force for a steering operation; and speed reduction means including an input shaft driven by the motor, an output shaft connected to the steering shaft, and a planetary gear mechanism for reducing the rotational speed of the input shaft and transmitting the reduced rotational speed thereof to the output shaft. The planetary gear mechanism includes a sun gear which is rotatable together with the input shaft, a ring gear, planet gears connected to the output shaft such that the revolving motion thereof around the sun gear is transmitted to the output shaft, and a gear case for accommodating the sun gear, the ring gear, and the planet gears. The above-described apparatus further comprises an electromagnetic clutch means actuated in response to the output of the detection means to be switched over between a first position at which it locks the ring gear so that it cannot be rotated and a second position at which it releases the ring gear to allow it to be rotated with respect to the output shaft.

When the electromagnetic clutch means in the above-described power steering apparatus is at the first position, since the ring gear is locked so that it cannot be rotated, the planet gears revolve around the sun gear, and this revolving motion is transmitted to the output shaft. As a result, the rotation of the input shaft driven by the motor is transmitted through the planetary gear mechanism to the output shaft, so that an assisting force for the steering operation is applied to the steering shaft. When the detection means detects a failure of the motor or the like, the electromagnetic clutch means is switched over to the second position. This makes the ring gear rotatable, and revolution of the planet gears around the sun gear is thereby prevented. As a result, the input shaft is disengaged from the output shaft, and the steering operation in which the steering shaft is rotated by rotation of the steering wheel is enabled independently of the input shaft and the electric motor, eliminating the influence of the failed motor on the steering operation. The electromagnetic clutch means of this known power steering apparatus includes an electromagnetic solenoid provided on the outside of the gear case, and an operation pin protruding into the gear case, the operation pin being extended and drawn by the electromagnetic solenoid. In this electromagnetic clutch means, when the operation pin is extended, it engaged with the ring gear accommodated in the gear case, locking it so that it cannot be rotated. When the operation pin is drawn into the solenoid, the locking of the ring gear is released, and the ring gear becomes rotatable. This arrangement, however, is disadvantageous in that installation of the electromagnetic solenoid in a vehicle is troublesome because it protrudes from the gear case. Further, it has been necessary to use an electromagnetic solenoid of large size which generates a strong magnetic field in order to ensure that the ring gear is locked by this operation pin. It is also difficult to provide the operation pin with sufficient strength to ensure a good quality operation thereof.

SUMMARY OF THE INVENTION

Accordingly, an object of the present invention is to provide an electric power steering apparatus which can eliminate the above-described problems of the prior art, and which includes a compact electromagnetic clutch means which can be easily installed in a vehicle.

Another object of the present invention is to provide an electric power steering apparatus including an electromagnetic clutch means which has adequate strength and which can operate smoothly.

To this end, there is provided an electric power steering apparatus comprising: a steering shaft; means for detecting an operation of the power steering apparatus; an electric motor adapted to be driven in response to an output of the detecting means for generating an assisting force for a steering operation; speed reduction means including an input shaft adapted to be driven by the electric motor, an output shaft connected to the steering shaft, and a planetary gear mechanism for reducing the rotational speed of the input shaft and transmitting the reduced rotational speed to the output shaft, the planetary gear mechanism including a sun gear rotatable together with the input shaft, a ring gear, planet gears connected to the output shaft and adapted to transmit revolving motion around the sun gear to the output shaft, and a gear case for accommodating the sun gear, the ring gear, and the planet gears; and electromagnetic clutch means accommodated in the gear case and adapted to be actuated in response to the output of the detecting means to be switched over between a first position in which it locks the ring gear to make the latter unrotatable and a second position in which it releases the ring gear to allow the latter to the rotatable with respect to the output shaft.

Other objects, features and advantages of the invention will become clear from the following description of the preferred embodiment when the same is read in conjunction with the accompanying drawings.

DETAILED DESCRIPTION OF THE PREFERRED EMBODIMENT

Figure 1:
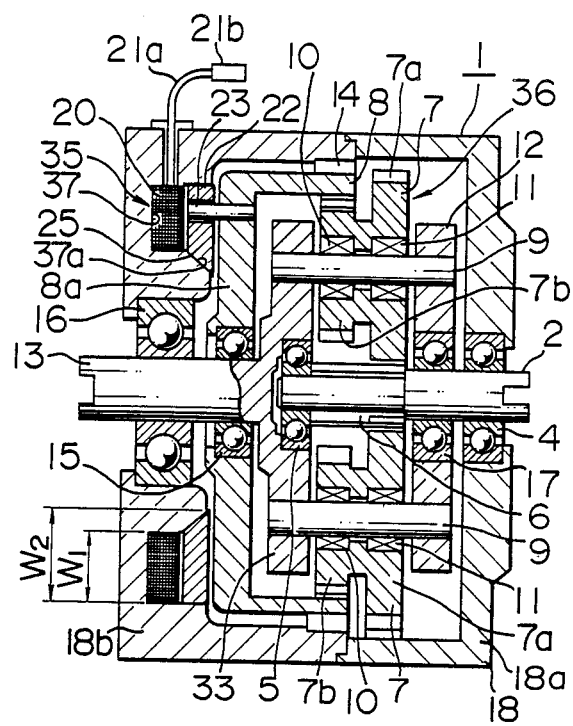
FIG. 1 is a longitudinal sectional view of a reduction gear and an electromagnetic clutch which are incorporated in an electric power steering apparatus of the present invention.

FIG. 1 is a longitudinal sectional view of a reduction gear and an electromagnetic clutch which are incorporated in an electric power steering apparatus of this embodiment. The reduction gear 1 incorporating a planetary gear mechanism 36 has an input shaft 2 by which the power of a motor 3 (FIG. 3) is transmitted to the reduction gear 1. The input shaft 2 is rotatably supported by ball bearings 4 and 5, and a sun gear 6 is fixed thereto. The planetary gear mechanism 36 of this embodiment includes two planet gears 7 which are in opposed relationship with respect to the axis. Each planet gear 7 comprises a large diameter portion 7a which engages with the sun gear 6 and a small diameter portion 7b that engages with a ring gear 8. Each planet gear 7 is rotatably supported on a support shaft 9 through needle roller bearings 10 and 11. The right end of each support shaft 9 is fixed to a plate 12 which is rotatably fitted onto the input shaft 12 through a ball bearing 17, while the left end thereof is fixed to a carrier 33 which is integral with the output shaft 13 and fitted onto the ball bearing 5. The ring gear 8 is rotatably supported on a gear case through a plane bearing 14 and on the output shaft 13 through a ball bearing 15. The output shaft 13 is connected to a steering shaft 34 through a pinion 30 (FIG. 3) of a rack pinion mechanism.

The gear case 18 incorporating the planetary gear mechanism 36 including the sun gear 6, the planet gears 7, and the ring gear 8 comprises a case portion 18a located on the right side as viewed in FIG. 1 and a case portion 18b located on the left side as viewed in the same way, the case portions 18a and 18b being formed as a unit. The case portion 18a rotatably supports the input shaft 2 through the ball bearing 4, and the case portion 18b rotatably supports the output shaft 13 through a ball bearing 16. The case portion 18b is a wall made of a magnetic material such as iron. The case portion 18b is provided with an annular recess 37 which extends around the output shaft 13 and opens toward a side wall portion of the ring gear 8. The recess 37 has a surface 37a in the vicinity of the opened end thereof which is inclined such that the width of the recess 37 gradually increases as the surface becomes closer to the side wall portion 8a. In other words, with the inclined surface 37a, the width in the vicinity of the opened end of the recess 37 is gradually increased from W1 to W2 toward the side wall portion 8a.

Figure 2:
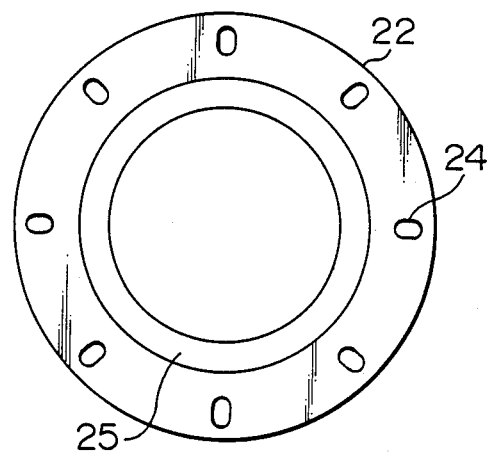
FIG. 2 is a front view of a movable ring of the electromagnetic clutch.

The electromagnetic clutch 35 includes a coil 20 and a movable member, i.e., a movable ring 22 made of a magnetic material such as iron. The coil 20 is fixed to the bottom of the recess 37 by means of a resin or the like, and is connected through a lead 21a and a terminal 21b to a control device 28 which is located outside the reduction gear, and further to a battery 29 through a lead 21c. The movable ring 22 has a surface 25 which is inclined in such a manner that its inclination is complementary to that of the inclined surface 37a. It is inserted in the vicinity of the opened end of the recess 37. As can be seen from FIGS. 1 and 2, the side wall portion 8a of the ring gear 8 is provided with a plurality of pins 23 protruding toward the recess 37. Elongated holes 24 formed in the movable ring 22 loosely receive the distal ends of the pins 23 in such a manner that the movable ring 22 can move in the axial directions of the pins 23.

As is clear from the foregoing description, the arrangement of the reduction gear and the electromagnetic clutch is such that the gear case 18 of the reduction gear 1 incorporates the electromagnetic clutch 35. With this arrangement, the rotational force transmitted to the input shaft 2 from the motor 3 is transmitted through the sun gear 6 to the planet gears 7 and the ring gear. If the coil 20 of the electromagnetic clutch 35 has been energized via the leads 21c and 21a and the movable ring 22 has therefore been attracted toward the coil 20, the inclined surface 25 of the movable ring 22 frictionally engages with the inclined surface 37a of the case portion 18b in the state wherein the former is tightly fitted to the later. This frictional engaging force generated between the inclined surfaces 25 and 37a fixes the movable ring 22 in place so that it cannot be rotated with respect to the gear case 18, thereby locking the ring gear 8 connected to the movable ring 22 through the pins 23 so that it cannot be rotated. As a result, the planet gears 7 revolve around the sun gear 6 while turning round on their support shafts 9 in response to the rotation of the input shaft 2 and the sun gear 6 formed integrally therewith. This revolving motion of the planet gears 7 is transmitted to the output shaft 13 which is connected integrally with the support shafts 9 so as to rotate it. In other words, the output shaft 13 is rotated at a speed which is reduced below the rotational speed of the input shaft 2 in accordance with the gear ratios of the sun gear 6, the planet gears 7, and the ring gear 8. Although the relationship between the above-described gear ratios and the reduction ratios of the rotational speed is known to those skilled in the art and detailed description thereof is therefore omitted here, the gear ratios may be so determined that they ensure a reduction ratio of, for example, about 15–16:1. When the coil 20 is de-energized and the attaching force which has acted on the movable ring 22 disappears, the inclined surface 25 becomes slidable with respect to the inclined surface 37a, making the ring gear 8 rotatable around the output shaft 13. As a result, when the sun gear 6 is rotated in response to the rotation of the input shaft 2, the planet gears 7 turn around their support shafts 9 but do not revolve around the sun gear 6. This means that the rotation of the input shaft 2 does not cause rotation of the output shaft 13.

Thus, the electromagnetic clutch 35 can be switched over between a first condition or a first position at which it locks the ring gear 8 so that the ring gear 8 is unrotatable and the rotational speed of the input shaft 2 is reduced, the reduced rotational speed thereof thereby being transmitted to the output shaft 13, and a second condition or a second position at which it releases the ring gear 8 so that it is rotatable and the input shaft 2 is thereby separated from the output shaft 13. When the electromagnetic clutch is at the first position, the rotational speed of the input shaft 2 driven by the motor 3 is transmitted through the output shaft 13 to the pinion 30 provided at one end of the steering shaft 34, applying thereto an assisting force for a steering operation. On the other hand, when the electromagnetic clutch is at the second position, the input shaft 2 is disengaged from the output shaft 13, i.e., the motor 3 is disengaged from the pinion 30, and the steering shaft 34 can be rotated independently of the motor 3.

As described above, the elongated holes 24 in the movable ring 22 loosely receive the pins 23, so that the movable ring 22 can be moved in the axial directions of the pins 23. With the provision of the elongated holes 24 which loosely receive the pins 23, the movable ring 22 can be moved slightly in the direction of crossing the pins 23. This arrangement is advantageous in that the movable ring 22 can be moved smoothly with respect to the pins 23. More specifically, even if the center line of the movable ring 22 is not parallel to the axes of the pins 23, the movable ring 22 can move smoothly along the pins 23 when the coil 20 is energized, whereby the inclined surface 25 is made to fit tightly against the inclined surface 37a. Further, it is constructed that the movable ring 22 is inserted into the recess 37 of the case portion 18b, and the inclined surface 25 is frictionally engaged with the inclined surface 37a. This construction advantageously ensures that the movable ring 22 can be fixed with respect to the case portion 18b by virtue of the wedge effect. The electromagnetic clutch is switched over between the two positions by causing the inclined surface 25 of the movable ring 22 to become frictionally engaged with the inclined surface 37a of the case portion 18b and by releasing that engagement. This arrangement is effective to increase the strength, compared with the known apparatuses, such as that disclosed in the specification of the above-described Japanese Patent Laid-Open No. 16958/1983, in which the operation pin is employed to lock and unlock the ring gear.

Figure 3:
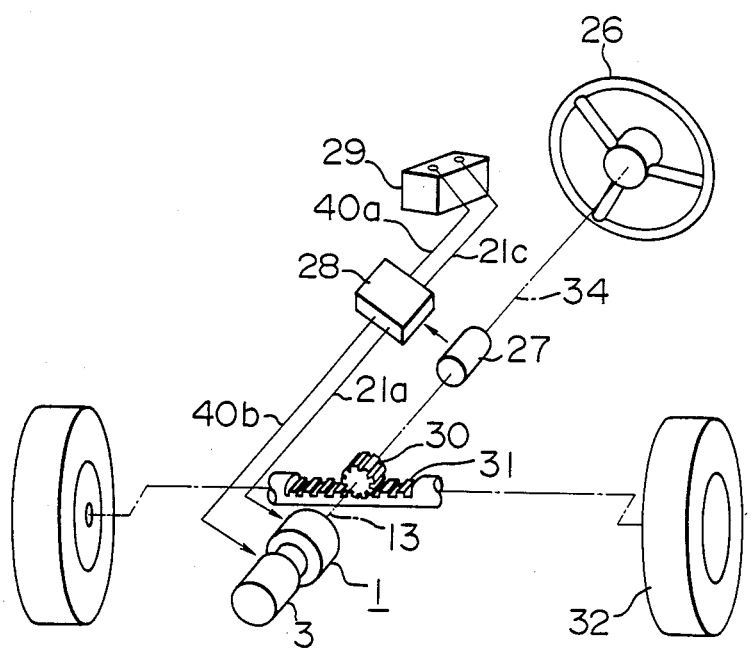
FIG. 3 is a schematic view of the power steering apparatus, showing the entire arrangement thereof.

FIG. 3 is a schematic view of the above-described electric power steering apparatus, showing the entire construction thereof. When a driver rotates a steering wheel 26, a detector, i.e., a torque sensor 27 provided on the steering shaft 34 detects steering torque from the torsion torque generated in the steering shaft, and transmits a corresponding output signal to the control device 28. The control device 28 supplies the power of a battery 29 to the motor 3 via leads 40a and 40b in response to the signal output from the torque sensor 27, and drives the motor 3. If the coil 20 has been energized and the electromagnetic clutch has thereby been placed at its first position, the torque generated by the motor 3 is transmitted to the pinion 30 via the reduction gear 1, assisting the steering wheel 26 in moving the rack 31 and thereby changing the direction of the wheels 32.

Thus, in the electric power steering apparatus of this embodiment, when steering force is applied thereto by the driver, the steering torque is detected from the torsion torque generated in the steering shaft by the torque sensor 27, and the value or amount of current supplied to the motor 3 is controlled by the control device 28 such that the motor 3 generates an assisting force which is predetermined in accordance with the torque value, so as to provide an assisting force for the steering operation of the driver.

However, there may be a case where part of the power steering apparatus such as the motor experiences failure and the presence of the motor would then become an obstacle to steering operations. If the motor 3 is, for example, locked so that it cannot be rotated for some unknown reason, the pinion 30 connected to the motor 3 via the output shaft 13, the planetary gear mechanism 36 and the input shaft 2 is also locked and it cannot be rotated. This means that the direction of the running vehicle cannot be controlled by rotating the steering wheel 26. In such case, the steering shaft 34 must be separated from the drive system by which the output of the motor 3 is transmitted to the steering shaft via the reduction gear 1 as an assisting force for the steering operation. The electromagnetic clutch 35 ensures this separation.

More specifically, when the motor 3 is locked and the steering shaft 34 is also locked via the reduction gear 1 and the pinon 30, the torque sensor 27 detects an abnormal amount of steering torque, and sends an output signal representative thereof to the control device 28. The control device 28 accordingly stops the supply of power from the battery 29 to the reduction gear 1 via the leads 21c and 21a, thereby de-energizing the coil 20. This causes the electromagnetic clutch to be switched over to the second position. As a result, the output shaft 13 is disengaged from the input shaft 2, i.e., the steering shaft 34 is disengaged from the motor 3, thereby enabling the steering operation to be conducted by rotating the steering wheel 26.

Failure of the power steering apparatus is not limited to the abovementioned locking of the motor, and it is not always necessary to employ the torque sensor 27 for the detection of abnormality. For example, excess driving current from the motor 3 may be detected by a suitable detector, and the electromagnetic clutch may be switched over to the second position by the detection of such excess driving current. Further, the switching over of the electromagnetic clutch to the second position may be effected in cases other than the case where abnormality is detected. For example, the switching over to the second position may be effected when a suitable detector detects the condition that assisting force need not be applied because of the small steering resistance at a time when the vehicle is running at high speed.

As is clear from the foregoing description, the electromagnetic clutch in the electric power steering apparatus of this invention is compact and is incorporated in the gear case of the reduction gear, and this enables the electric power steering apparatus of this invention to be instabled in a limited space of a vehicle available therefor.

What is claimed is:

1. An electric power steering apparatus comprising:
   a steering shaft;
   means for detecting an operation of said power steering apparatus;
   an electric motor adapted to be driven in response to an output of said detecting means for generating an assisting force for a steering operation;
   speed reduction means including an input shaft adapted to be driven by said electric motor, an output shaft connected to said steering shaft, and a planetary gear mechanism for reducing the rotational speed of said input shaft and transmitting said reduced rotational speed to said output shaft, said planetary gear mechanism including a sun gear rotatable together with said input shaft, a ring gear, planet gears connected to said output shaft and adapted to transmit revolving motion thereof around said sun gear to said output shaft, and a gear case for accommodating said sun gear, said ring gear, and said planet gears; and
   electromagnetic clutch means accommodated in said gear case and adapted to be actuated in reasons to the output of said detecting means to be switched over between a first position in which it locks said ring gear to make the latter unrotatable and a second position in which it releases the locking of said ring gear to allow the latter to be rotatable with respect to said output shaft;
   wherein said gear case includes a wall portion made of a magnetic material, and said electromagnetic clutch means includes a coil provided in said wall portion and a movable member made of a magnetic material, said movable member being movably supported by a side wall portion of said ring gear and frictionally engaging with said wall portion made of magnetic material when said coil is energized so as to lock said ring gear unrotatably.

2. An electric power steering apparatus according to claim 1, wherein said wall portion made of magnetic material has an annular recess having a predetermined depth, said recess extending around said output shaft and opening toward said side wall portion of said ring gear, the vicinity of the opened end of said recess having a surface inclined such that the width of said recess gradually increases as said surface becomes closer to said side wall portion, and said coil is accommodated in the vicinity of the bottom of said recess, while said movable member includes a movable ring inserted into the vicinity of the opened end of said recess, said movable ring having a surface inclined such that an inclination thereof is complementary to that of said inclined surface of said recess and frictionally engaging with said inclined surface of said recess when said coil is energized so as to lock said ring gear unrotatably.

3. An electric power steering apparatus according to claim 2, wherein said side wall portion of said ring gear has a plurality of pins protruding toward said recess, and said movable ring loosely engages with distal ends of said pins in such a manner that it can be moved in axial directions of said pins.

4. An electric power steering apparatus according to claim 1, wherein said detecting means is a torque sensor for detecting steering torque generated in said steering shaft.

* * * * *